(12) United States Patent
Phelan et al.

(10) Patent No.: US 7,671,156 B2
(45) Date of Patent: Mar. 2, 2010

(54) SILICONE HYDROGELS

(75) Inventors: John Christopher Phelan, Duluth, GA (US); Angelika Maria Domschke, Duluth, GA (US); Marcia Kay Ash, Snellville, GA (US)

(73) Assignee: Novartis AG, Basel (CH)

( * ) Notice: Subject to any disclaimer, the term of this patent is extended or adjusted under 35 U.S.C. 154(b) by 830 days.

(21) Appl. No.: 11/500,757

(22) Filed: Aug. 8, 2006

(65) Prior Publication Data

US 2007/0037898 A1    Feb. 15, 2007

Related U.S. Application Data

(60) Provisional application No. 60/706,961, filed on Aug. 10, 2005.

(51) Int. Cl.
*C08F 30/08*    (2006.01)

(52) U.S. Cl. .................... 526/279; 524/588

(58) Field of Classification Search ............... 526/279; 524/588
See application file for complete search history.

(56) References Cited

U.S. PATENT DOCUMENTS

| | | | |
|---|---|---|---|
| 4,139,513 A | 2/1979 | Tanaka et al. ............ 260/29.6 |
| 4,711,943 A | 12/1987 | Harvey, III ................ 526/279 |
| 5,219,965 A | 6/1993 | Valint, Jr. et al. ........... 526/245 |
| 5,260,000 A | 11/1993 | Nandu et al. ................ 264/2.1 |
| 5,310,779 A | 5/1994 | Lai .......................... 524/588 |
| 5,321,108 A | 6/1994 | Kunzler et al. ............. 526/242 |
| 5,331,073 A | 7/1994 | Weinschenk, III et al. .. 526/264 |
| 5,760,100 A | 6/1998 | Nicolson et al. ............ 523/106 |
| 5,776,999 A | 7/1998 | Nicolson et al. ............ 523/106 |
| 5,789,461 A | 8/1998 | Nicolson et al. ............ 523/106 |
| 5,848,811 A | 12/1998 | Sampson .................... 523/106 |
| 5,945,498 A | 8/1999 | Hopken et al. ............... 528/42 |
| 5,965,631 A | 10/1999 | Nicolson et al. ............ 523/106 |
| 6,315,650 B1 | 11/2001 | Council et al. ............. 451/384 |
| 6,649,722 B2 | 11/2003 | Rosenzweig et al. ....... 526/279 |
| 6,871,953 B1 | 3/2005 | Mandell et al. ............ 351/161 |
| 6,874,888 B1 | 4/2005 | Dudai ....................... 351/162 |
| 2002/0082340 A1 | 6/2002 | Hanke et al. ............... 524/588 |
| 2002/0197299 A1* | 12/2002 | Vanderlaan et al. ......... 424/429 |
| 2003/0105255 A1 | 6/2003 | Salamone et al. ........... 526/303 |
| 2004/0054026 A1 | 3/2004 | Kunzler et al. ............. 523/106 |
| 2004/0179167 A1 | 9/2004 | Dahi et al. .................. 351/160 |
| 2005/0027031 A1 | 2/2005 | Chang et al. ................. 522/68 |
| 2005/0031669 A1 | 2/2005 | Shafiee et al. .............. 424/426 |
| 2005/0033210 A1 | 2/2005 | Shahinpoor ................. 602/41 |
| 2005/0038219 A1 | 2/2005 | Lai et al. ..................... 528/32 |
| 2005/0041299 A1 | 2/2005 | Gallas ........................ 359/642 |
| 2005/0054802 A1 | 3/2005 | Lai et al. .................... 528/1.5 |
| 2005/0055091 A1 | 3/2005 | Lai et al. ................... 623/5.16 |
| 2005/0062933 A1 | 3/2005 | Perel et al. ................. 351/161 |
| 2005/0070661 A1 | 3/2005 | Molock ...................... 524/556 |
| 2005/0154080 A1 | 7/2005 | McCabe et al. ............ 523/107 |

FOREIGN PATENT DOCUMENTS

| | | |
|---|---|---|
| EP | 0908744 A1 | 4/1999 |
| EP | 0908744 B1 | 12/2002 |
| EP | 1 522 321 | 4/2005 |
| EP | 1 525 860 | 4/2005 |
| WO | WO 92/09639 | 6/1992 |
| WO | WO 93/05098 | 3/1993 |
| WO | WO 97/20852 | 6/1997 |
| WO | WO 2004/003034 | 1/2004 |
| WO | WO 2005/026216 | 3/2005 |
| WO | WO 2005/031442 | 4/2005 |

OTHER PUBLICATIONS

International Search Report.
Standard Search Report.
Query Structures.
PDMS & Acrylamide & Contact Lenses.
PDMS & IEM & Contact Lenses I.
PDMS & IIEM & Contact Lenses II.
PDMS & IIEM & Contact Lenses III.
Search VI.
Search VII.
International Preliminary Report on Patentability.

* cited by examiner

*Primary Examiner*—Kuo-Liang Peng
(74) *Attorney, Agent, or Firm*—Jian Zhou

(57) ABSTRACT

The present invention provides silicone hydrogel materials having relatively high oxygen permeability and a relatively low modulus. The relatively-low modulus is achieved by adding a chain transfer agent into a polymerizable fluid composition in an amount sufficient to provide to the resultant silicone hydrogel material with a reduced modulus. In addition, the invention provides silicone hydrogel contact lenses comprising a silicone hydrogel material of the invention, a method for making a silicone hydrogel material of the invention, and a method for making a silicone hydrogel contact lens of the invention.

34 Claims, No Drawings

SILICONE HYDROGELS

This application claims the benefit under 35 USC § 119 (e) of U.S. provisional application No. 60/706,961 filed Aug. 10, 2005 incorporated by reference in it's entirety.

The present invention is related to silicone hydrogel contact lenses. In particular, the present invention is related to a method of lowering elastic modulus of silicone hydrogel lenses while increasing or maintaining oxygen permeability (Dk), a formulation for making a silicone hydrogel material having relatively high oxygen permeability and low modulus, and contact lenses prepared from a formulation of the invention or made of a silicone hydrogel material of the invention.

BACKGROUND OF THE INVENTION

Currently, soft contact lenses are widely used for correcting many different types of vision deficiencies. Such wide adoption of soft contact lenses is partly due to their relatively-low elastic modulus. Unlike hard contact lenses (e.g., RGP lenses), soft contact lenses can be worn for sufficiently long periods of time and can provide patients with the benefits including adequate initial comfort (i.e., immediately after lens insertion), relatively short period of adapting time required for a patient to become accustomed to them, and/or proper fit. However, because the cornea does not receive oxygen from the blood supply like other tissue and because soft contact lenses conform closely to the shape of the eye so that oxygen cannot easily circumvent the lens, soft contact lenses must allow oxygen to diffuse through the lens to reach the cornea, namely having a relatively high oxygen transmissibility (i.e., oxygen permeability over the lens thickness) from the outer surface to the inner surface to allow sufficient oxygen permeate through the lens to the cornea and to have minimal adverse effects on corneal health. If sufficient oxygen does not reach the cornea, corneal swelling occurs. Extended periods of oxygen deprivation cause the undesirable growth of blood vessels in the cornea. Oxygen permeability and elastic modulus of silicone hydrogel contact lenses play a critical role in lens comfort and corneal health.

High oxygen permeable silicone hydrogel materials have been developed to have a high oxygen permeability (Dk) and to make contact lenses capable of providing corneal health benefits. But, wearing comfort requirement necessitates a relatively low modulus. The ability to decrease elastic modulus of a silicone hydrogel without negatively impacting oxygen permeability has been a challenge in the contact lens industry. Several approaches have been developed, including, for example, increasing the percentage hydrophilic monomer concentration in a lens formulation, lowering the percentage of silicon-containing macromer (e.g., betacon or polydimethylsiloxane (PDMS) macromer) in a lens formulation, using a customized modulus-lowering monomer in a polymer formulation (U.S. Pat. No. 5,908,906), using a combination of mono- and di-vinyl functionalized macromers, or combinations thereof. Each of the known approaches have one or more of the following disadvantages. First, lowering modulus is often accompanied by decreasing Dk. Second, use of customized modulus-lowering monomer(s) or mono-vinyl-functionalized macromer(s) can increase lens production cost. Third, they may cause undesirable changes in physical properties of a silicone hydrogel material. For example, replacement of methacrylate by a corresponding acrylate in a lens formulation can lower not only the modulus but also the glass transition and hardness of a resultant silicon hydrogel material and therefore adversely affect the lathing ability of the resultant hydrogel material. Because of one or more above-described disadvantages, the known approaches have limitations in their practical use in the contact lens manufacturing.

It would be desirable to have a silicone hydrogel material that has high oxygen permeability and low modulus (e.g. preferably less than 1.0 MPa). Therefore, there are needs for a method of increasing oxygen permeability (Dk) and lowering or at least maintaining the elastic modulus of silicone hydrogel lenses, for a formulation capable of forming a silicone hydrogel material having relatively high oxygen permeability and low modulus, and for silicone hydrogel contact lenses having relatively high oxygen permeability and low modulus.

SUMMARY OF THE INVENTION

The present invention, in one aspect, provides a method for making a silicone hydrogel material with a high oxygen permeability and a relatively low modulus. The method of the invention comprises: obtaining a polymerizable fluid composition including a siloxane-containing macromer with ethylenically unsaturated group(s) and a chain transfer agent; and polymerizing the polymerizable fluid composition to form the silicone hydrogel material, wherein the chain transfer agent is present in the polymerizable fluid composition in an amount sufficient to provide a reduced elastic modulus to the silicone hydrogel material while increasing or minimally decreasing or maintaining the oxygen permeability of the silicone hydrogel material, wherein the silicone hydrogel material has an oxygen permeability of at least about 40 barrers, an ionoflux diffusion coefficient of great than about $1.5 \times 10^{-6}$ mm$^2$/min, and a water content of at least about 15% by weight when fully hydrated.

The present invention, in another aspect, provides a method for making silicone hydrogel contact lenses with relatively high oxygen permeability and a relatively low modulus. The method of the invention comprises: obtaining a polymerizable fluid composition including a siloxane-containing macromer with ethylenically unsaturated group(s) and at least one chain transfer agent; introducing the polymerizable fluid composition into a mold for making a contact lens; and polymerizing the polymerizable fluid composition in the mold to form a silicone hydrogel contact lens, wherein the chain transfer agent is present in the polymerizable fluid composition in an amount sufficient to provide to the silicone hydrogel contact lens with a reduced elastic modulus while increasing or minimally decreasing or maintaining the oxygen permeability of the silicone hydrogel contact lens, wherein the silicone hydrogel contact lens has an oxygen permeability of at least about 40 barrers, an ionoflux diffusion coefficient of great than about $1.5 \times 10^{-6}$ mm$^2$/min and a water content of at least 15 weight percent when fully hydrated.

The present invention, in a further aspect, provides a silicone hydrogel material which: (1) is a copolymerization product of a polymerizable fluid composition comprising (a) at least one siloxane-containing macromer with ethylenically unsaturated group(s) and (b) at least one chain transfer agent in an amount sufficient to provide a reduced elastic modulus to the silicone hydrogel material; and (2) is characterized by having an oxygen permeability of at least about 40 barrers, an ionoflux diffusion coefficient of great than about $1.5 \times 10^{-6}$ mm$^2$/min, and a water content of at least about 15% by weight when fully hydrated.

The present invention, in a still further aspect, provides an ophthalmic device having: (1) a copolymer is a copolymerization product of a polymerizable fluid composition comprising (a) at least one siloxane-containing macromer with ethylenically unsaturated group(s) and (b) at least one chain transfer agent in an amount sufficient to provide a reduced elastic modulus to the copolymer; (2) an oxygen permeability of at least about 40 barrers; (3) an ionoflux diffusion coefficient of great than about $1.5 \times 10^{-6}$ mm$^2$/min; and (4) a water content of at least about 15% by weight when fully hydrated.

DETAILED DESCRIPTION OF EMBODIMENTS OF THE INVENTION

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as common within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

An "ophthalmic device", as used herein, refers to a contact lens (hard or soft), an intraocular lens, a corneal onlay, other ophthalmic devices (e.g., stents, glaucoma shunt, or the like) used on or about the eye or ocular vicinity.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. Typically, a contact lens has an anterior surface and an opposite posterior surface and a circumferential edge where the anterior and posterior surfaces are tapered off.

The "front or anterior surface" of a contact lens, as used herein, refers to the surface of the lens that faces away from the eye during wear. The anterior surface, which is typically substantially convex, may also be referred to as the front curve of the lens.

The "rear or posterior surface" of a contact lens, as used herein, refers to the surface of the lens that faces towards the eye during wear. The rear surface, which is typically substantially concave, may also be referred to as the base curve of the lens.

"Ocular environment", as used herein, refers to ocular fluids (e.g., tear fluid) and ocular tissue (e.g., the cornea) which may come into intimate contact with a contact lens used for vision correction, drug delivery, wound healing, eye color modification, or other ophthalmic applications.

A "hydrogel" refers to a polymeric material which can absorb at least 10 percent by weight of water when it is fully hydrated. Generally, a hydrogel material is obtained by polymerization or copolymerization of at least one hydrophilic monomer in the presence of or in the absence of additional monomers and/or macromers.

A "silicone hydrogel" refers to a hydrogel obtained by copolymerization of a polymerizable composition comprising at least one silicone-containing vinylic monomer or at least one silicone-containing macromer.

"Hydrophilic," as used herein, describes a material or portion thereof that will more readily associate with water than with lipids.

As used herein, "actinically" in reference to curing or polymerizing of a polymerizable composition or material means that the curing (e.g., crosslinked and/or polymerized) is performed by actinic irradiation, such as, for example, UV irradiation, ionized radiation (e.g. gamma ray or X-ray irradiation), microwave irradiation, and the like. Thermal curing or actinic curing methods are well-known to a person skilled in the art.

A "prepolymer" refers to a starting polymer which can be cured (e.g., crosslinked and/or polymerized) actinically or thermally or chemically to obtain a crosslinked and/or polymerized polymer having a molecular weight much higher than the starting polymer. A "crosslinkable prepolymer" refers to a starting polymer which can be crosslinked upon actinic radiation to obtain a crosslinked polymer having a molecular weight much higher than the starting polymer.

A "monomer" means a low molecular weight compound that can be polymerized. Low molecular weight typically means average molecular weights less than 700 Daltons.

A "vinylic monomer", as used herein, refers to a low molecular weight compound that has an ethylenically unsaturated group and can be polymerized actinically or thermally. Low molecular weight typically means average molecular weights less than 700 Daltons.

The term "olefinically unsaturated group" is employed herein in a broad sense and is intended to encompass any groups containing at least one >C=C< group. Exemplary ethylenically unsaturated groups include without limitation acryloyl, methacryloyl, allyl, vinyl, styrenyl, or other C=C containing groups.

A "hydrophilic vinylic monomer", as used herein, refers to a vinylic monomer which is capable of forming a homopolymer that is water-soluble or can absorb at least 10 percent by weight water.

A "hydrophobic vinylic monomer", as used herein, refers to a vinylic monomer which is capable of forming a homopolymer that is insoluble in water and can absorb less than 10 percent by weight water.

A "macromer" refers to a medium to high molecular weight compound or polymer that contains functional groups capable of undergoing further polymerizing/crosslinking reactions. Medium and high molecular weight typically means average molecular weights greater than 700 Daltons. Preferably, a macromer contains ethylenically unsaturated groups and can be polymerized actinically or thermally.

"Molecular weight" of a polymeric material (including monomeric or macromeric materials), as used herein, refers to the number-average molecular weight unless otherwise specifically noted or unless testing conditions indicate otherwise.

A "polymer" means a material formed by polymerizing/crosslinking one or more monomers, macromers and/or oligomers.

A "photoinitiator" refers to a chemical that initiates radical crosslinking and/or polymerizing reaction by the use of light. Suitable photoinitiators include, without limitation, benzoin methyl ether, diethoxyacetophenone, a benzoylphosphine oxide, 1-hydroxycyclohexyl phenyl ketone, Darocure® types, and Irgacure® types, preferably Darocure® 1173, and Irgacure® 2959.

A "thermal initiator" refers to a chemical that initiates radical crosslinking/polymerizing reaction by the use of heat energy. Examples of suitable thermal initiators include, but are not limited to, 2,2'-azobis (2,4-dimethylpentanenitrile), 2,2'-azobis (2-methylpropanenitrile), 2,2'-azobis (2-methylbutanenitrile), peroxides such as benzoyl peroxide, and the like. Preferably, the thermal initiator is azobisisobutyronitrile (AIBN).

"Visibility tinting" in reference to a lens means dying (or coloring) of a lens to enable the user to easily locate a lens in a clear solution within a lens storage, disinfecting or cleaning container. It is well known in the art that a dye and/or a pigment can be used in visibility tinting a lens.

"Dye" means a substance that is soluble in a solvent and that is used to impart color. Dyes are typically translucent and absorb but do not scatter light. Any suitable biocompatible dye can be used in the present invention.

A "Pigment" means a powdered substance that is suspended in a liquid in which it is insoluble. A pigment can be a fluorescent pigment, phosphorescent pigment, pearlescent pigment, or conventional pigment. While any suitable pigment may be employed, it is presently preferred that the pigment be heat resistant, non-toxic and insoluble in aqueous solutions.

The term "fluid" as used herein indicates that a material is capable of flowing like a liquid.

"Surface modification", as used herein, means that an article has been treated in a surface treatment process (or a surface modification process), in which, by means of contact with a vapor or liquid, and/or by means of application of an energy source (1) a coating is applied to the surface of an article, (2) chemical species are adsorbed onto the surface of an article, (3) the chemical nature (e.g., electrostatic charge) of chemical groups on the surface of an article are altered, or (4) the surface properties of an article are otherwise modified. Exemplary surface treatment processes include, but are not limited to, a surface treatment by energy (e.g., a plasma, a static electrical charge, irradiation, or other energy source), chemical treatments, the grafting of hydrophilic monomers or macromers onto the surface of an article, and layer-by-layer (LbL) deposition of polyelectrolytes. A preferred class of surface treatment processes are plasma processes, in which an ionized gas is applied to the surface of an article, and LbL coating processes.

Plasma gases and processing conditions are described more fully in U.S. Pat. Nos. 4,312,575 and 4,632,844 and published U.S. Patent Application No. 2002/0025389, which are incorporated herein by reference. The plasma gas is preferably a mixture of lower alkanes and nitrogen, oxygen or an inert gas.

"LbL coating", as used herein, refers to a coating that is not covalently attached to an article, preferably a medical device, and is obtained through a layer-by-layer ("LbL") deposition of polyionic (or charged) and/or non-charged materials on an article. An LbL coating can be composed of one or more layers, preferably one or more bilayers.

The term "bilayer" is employed herein in a broad sense and is intended to encompass: a coating structure formed on a medical device by alternatively applying, in no particular order, one layer of a first polyionic material (or charged material) and subsequently one layer of a second polyionic material (or charged material) having charges opposite of the charges of the first polyionic material (or the charged material); or a coating structure formed on a medical device by alternatively applying, in no particular order, one layer of a first charged polymeric material and one layer of a non-charged polymeric material or a second charged polymeric material. It should be understood that the layers of the first and second coating materials (described above) may be intertwined with each other in the bilayer.

Formation of an LbL coating on an ophthalmic device may be accomplished in a number of ways, for example, as described in U.S. Pat. No. 6,451,871 (herein incorporated by reference in its entirety) and U.S. patent application publication Nos. US 2001-0045676 A1, US 2001-0048975 A1, and US 2004-0067365 A1 (herein incorporated by reference in their entireties). One coating process embodiment involves solely dip-coating and dip-rinsing steps. Another coating process embodiment involves solely spray-coating and spray-rinsing steps. However, a number of alternatives involve various combinations of spray- and dip-coating and rinsing steps may be designed by a person having ordinary skill in the art.

An "antimicrobial agent", as used herein, refers to a chemical that is capable of decreasing or eliminating or inhibiting the growth of microorganisms such as that term is known in the art.

"Antimicrobial metals" are metals whose ions have an antimicrobial effect and which are biocompatible. Preferred antimicrobial metals include Ag, Au, Pt, Pd, Ir, Sn, Cu, Sb, Bi and Zn, with Ag being most preferred.

"Antimicrobial metal-containing nanoparticles" refer to particles having a size of less than 1 micrometer and containing at least one antimicrobial metal present in one or more of its oxidation states.

"Antimicrobial metal nanoparticles" refer to particles which is made essentially of an antimicrobial metal and have a size of less than 1 micrometer. The antimicrobial metal in the antimicrobial metal nanoparticles can be present in one or more of its oxidation states. For example, silver-containing nanoparticles can contain silver in one or more of its oxidation states, such as $Ag^0$, $Ag^{1+}$, and $Ag^{2+}$.

"Stabilized antimicrobial metal nanoparticles" refer to antimicrobial metal nanoparticles which are stabilized by a stabilizer during their preparation. Stabilized antimicrobial metal nano-particles can be either positively charged or negatively charged or neutral, largely depending on a material (or so-called stabilizer) which is present in a solution for preparing the nano-particles and can stabilize the resultant nano-particles. A stabilizer can be any known suitable material. Exemplary stabilizers include, without limitation, positively charged polyionic materials, negatively charged polyionic materials, polymers, surfactants, salicylic acid, alcohols and the like.

The "oxygen transmissibility" of a lens, as used herein, is the rate at which oxygen will pass through a specific ophthalmic lens. Oxygen transmissibility, Dk/t, is conventionally expressed in units of barrers/mm, where t is the average thickness of the material [in units of mm] over the area being measured and "barrer/mm" is defined as:

$$[(cm^3 oxygen)/(cm^2)(sec)(mm^2 Hg)] \times 10^{-9}$$

The intrinsic "oxygen permeability", Dk, of a lens material does not depend on lens thickness. Intrinsic oxygen permeability is the rate at which oxygen will pass through a material. Oxygen permeability is conventionally expressed in units of barrers, where "barrer" is defined as:

$$[(cm^3 oxygen)(mm)/(cm^2)(sec)(mm^2 Hg)] \times 10^{-10}$$

These are the units commonly used in the art. Thus, in order to be consistent with the use in the art, the unit "barrer" will have the meanings as defined above. For example, a lens having a Dk of 90 barrers ("oxygen permeability barrers") and a thickness of 90 microns (0.090 mm) would have a Dk/t of 100 barrers/mm (oxygen transmissibility barrers/mm). In accordance with the invention, a high oxygen permeability in reference to a material or a contact lens characterized by apparent oxygen permeability of at least 40 barrers or larger measured with a sample (film or lens) of 100 microns in thickness according to a coulometric method described in Examples.

The "ion permeability" through a lens correlates with both the Ionoflux Diffusion Coefficient and the Ionoton Ion Permeability Coefficient.

The Ionoflux Diffusion Coefficient, D, is determined by applying Fick's law as follows:

$$D = -n'/(A \times dc/dx)$$

where $n'$=rate of ion transport [mol/min]
  $A$=area of lens exposed [mm$^2$]
  $D$=Ionoflux Diffusion Coefficient [mm$^2$/min]
  $dc$=concentration difference [mol/L]
  $dx$=thickness of lens [mm]

The Ionoton Ion Permeability Coefficient, P, is then determined in accordance with the following equation:

$$\ln(1-2C(t)/C(0)) = -2APt/Vd$$

where: $C(t)$=concentration of sodium ions at time t in the receiving cell
  $C(0)$=initial concentration of sodium ions in donor cell
  $A$=membrane area, i.e., lens area exposed to cells
  $V$=volume of cell compartment (3.0 ml)
  $d$=average lens thickness in the area exposed
  $P$=permeability coefficient An Ionoflux Diffusion Coefficient, D, of greater than about $1.5 \times 10^{-6}$ mm$^2$/min is preferred, while greater than about $2.6 \times 10^{-6}$ mm$^2$/min is more preferred and greater than about $6.4 \times 10^{-6}$ mm$^2$/min is most preferred.

It is known that on-eye movement of the lens is required to ensure good tear exchange, and ultimately, to ensure good corneal health. Ion permeability is one of the predictors of on-eye movement, because the permeability of ions is believed to be directly proportional to the permeability of water.

The term "oxyperm component in a polymerizable composition" as used herein, refers to monomers, oligomers, macromers, and the like, and mixtures thereof, which are capable of polymerizing with like or unlike polymerizable materials to form a polymer which displays a relatively high rate of oxygen diffusion therethrough.

The term "a reduced elastic modulus" is intended to describe that the elastic modulus of a silicone hydrogel material prepared from a polymerizable fluid composition with at least one chain transfer agent is lower than, preferably at least about 20%, more preferably at least about 30%, more preferably at least about 40% lower than that of a control silicone hydrogel material prepared from a control polymerizable composition, wherein the polymerizable fluid composition is prepared by adding the chain transfer agent into the control polymerizable fluid composition.

Room temperature (or ambient temperature) is defined as 22±6° C.

The term "lathability" in reference to a material is referred to its capability to be machined into a contact lens with optical quality using typical lens lathing equipments. One gauge of lathability of a material is its predominant glass transition temperature ($T_g$). Single phase polymeric materials with one $T_g$ below room temperature (i.e., lathing temperature) are considered to be too soft for room temperature lathing whereas those with $T_g$ above room temperature (i.e., lathing temperature), preferably at least 3 degrees above room temperature, have sufficient hardness for lathing at room temperature. Microscopically multiphasic polymeric materials may display one predominant (apparently single) $T_g$ or more than one $T_g$. As long as a microscopically multiphasic polymeric material has a $T_g$ (predominant glass transition temperature) associated with the dominant phase of the material being at room temperature or above, it can be lathed into contact lenses at room temperature. "Dominant phase" is defined herein as a phase in a multiphasic material that determines the overall (bulk or working) hardness of a material.

The term "rod" refers to a cylinder cast-molded from a lens-forming material in a tube, wherein the cylinder has a length of about 1 cm or longer.

The term "button" refers to a short cylinder (with length of about 1 cm or less) cast-molded from a lens-forming material in a mold. In accordance with the present invention, both the opposite surfaces of a button can flat and curved. For example, one of the two opposite surfaces of a button can be a concave curved (e.g., hemispherical) surface whereas the other surface is a convex curved (e.g., hemispherical) surface.

The term "bonnet" refers to a polymeric button cast-molded from a lens-forming material in a mold, wherein at least one of the two opposite surfaces of the bonnet has an optically finished surface corresponding to one of the anterior and posterior surfaces of a contact lens. The term "optically finished" in reference to a surface or a zone in a surface refers to a surface of a contact lens or a zone in a surface of a contact lens, wherein the surface or zone does not need to undergo further processing, e.g., such as, polishing or lathing. One could also machine lenses from pseudo bonnets. A pseudo bonnet is a part that would require lathing of both sides of the material in order to obtain a contact lens. This type of part would allow for flexibility in the design of the front an back surfaces of a lens while minimizing material losses.

The present invention is generally directed to methods for reducing the elastic modulus of a silicone hydrogel material or a silicone hydrogel contact lens while increasing or minimally reducing its oxygen permeability and to a silicone hydrogel material or contact lens made according to a method of the invention. The present invention is partly based on the discovery that a simple, inexpensive reagent, e.g., a chain transfer agent, which can be used in a relatively low amount (e.g., less than about 1%) in a polymerizable composition (formulation) can impart to a resultant silicone hydrogel material or contact lens a reduced elastic modulus while oxygen permeability is increased or minimally impacted. It is believed that the chain transfer agent lowers modulus by decreasing crosslink density. For formulations that rely on one or more silioxane-containing macromers to enhance Dk, it is difficult to significantly alter crosslink density without compromising Dk since the siloxane-containing macromer can function as Dk-enhancing materials and also as crosslinkers. The use of chain transfer agent, e.g., a 2-mercaptoethanol, solves this problem. The present invention is also partly based on the discovery that incorporation of a chain transfer agent in a lens formulation for making contact lenses has a negligible adverse impact on other lens properties, such as, for example, refractive index, ion or water permeability, water content, room temperature lathability, etc. With a method of the invention, silicone hydrogel contact lenses with high oxygen permeability and low elastic modulus can be produced in a cost-effective and efficient manner.

The present invention, in one aspect, provides a method for making a silicone hydrogel material with a high oxygen permeability and a relatively low modulus. The method of the invention comprises: obtaining a polymerizable fluid composition including a siloxane-containing macromer with ethylenically unsaturated group(s) and a chain transfer agent; and polymerizing the polymerizable fluid composition to form the silicone hydrogel material, wherein the chain transfer agent is present in the polymerizable fluid composition in an amount sufficient to provide a reduced elastic modulus to the silicone hydrogel material while increasing or minimally decreasing or maintaining the oxygen permeability of the silicone hydrogel material, wherein the silicone hydrogel material has an oxygen permeability of at least about 40 barrers, an ionoflux diffusion coefficient of great than about $1.5 \times 10^{-6}$ mm$^2$/min, and a water content of at least about 15% by weight when fully hydrated.

Preferably, a silicone hydrogel material made according to a method of the invention is characterized by having an oxygen permeability of at least 70 barrers and a modulus of less than about 1.5 MPa.

In accordance with the present invention, a polymerizable fluid composition can be a solution, a dispersion, a solvent-free liquid, or a melt at a temperature below 60° C.

Where a polymerizable fluid composition is a solution, it can be prepared by dissolving at least one siloxane-containing macromer with ethylenically unsaturated group(s) and all other desired components in any suitable solvent known to a person skilled in the art. Examples of suitable solvents are alcohols, such as lower alkanols, for example ethanol or methanol, and furthermore carboxylic acid amides, such as dimethylformamide, dipolar aprotic solvents, such as dimethyl sulfoxide or methyl ethyl ketone, ketones, for example acetone or cyclohexanone, hydrocarbons, for example toluene, ethers, for example THF, dimethoxyethane or dioxane, and halogenated hydrocarbons, for example trichloroethane, and also mixtures of suitable solvents, for example mixtures of water with an alcohol, for example a water/ethanol or a water/methanol mixture.

Alternatively, a polymerizable fluid composition of the invention can be obtained by adding a desired amount of one or more chain transfer agent into any formulations for making soft contact lenses. Exemplary formulations include without limitation the formulation of lotrafilcon A, lotrafilcon B, etafilcon A, genfilcon A, lenefilcon A, polymacon, acquafilcon A, and balafilcon.

Where a polymerizable fluid composition is a solvent-free liquid, it can be prepared by dissolving at least one siloxane-containing macromer with ethylenically unsaturated group(s) and all other desired components in an amount of one or more blending vinylic monomers. By removing solvent from a polymerizable composition, an obtained silicone hydrogel material may not necessary to be subjected to a process in which a solvent is removed from the silicone hydrogel material so as to reduce its stickiness and/or softness and as such, the silicone hydrogel material can be directly lathed at room temperature to make contact lenses. In addition, it is discovered that by using a solvent-free polymerizable composition, one can obtain a silicone hydrogel material having relatively low level of extractable chemicals (i.e., so called extractables). Therefore, a costly extraction process may not be needed in the production of contact lenses with a silicone hydrogel material prepared from a solvent-free polymerizable composition.

In accordance with the invention, a "blending vinylic monomer" refers to a vinylic monomer which can function both as a solvent to dissolve both hydrophilic and hydrophobic components of a polymerizable composition of the invention and as one of polymerizable components to be polymerized to form a silicone hydrogel material. Preferably, the blending vinylic monomer is present in the polymerizable composition in an amount of from about 5% to about 30% by weight.

Any suitable vinylic monomers, capable of dissolving both hydrophilic and hydrophobic components of a polymerizable composition of the invention to form a solution, can be used in the invention. Preferred examples of blending vinylic monomers include, without limitation, aromatic vinylic monomers, cycloalkyl-containing vinylic monomers. Those preferred blending monomers can increase the predominant glass transition temperature of a silicone hydrogel material prepared by curing a polymerizable composition containing those preferred blending monomer.

Examples of preferred aromatic vinylic monomers include styrene, 2,4,6-trimethylstyrene (TMS), t-butyl styrene (TBS), 2,3,4,5,6-pentafluorostyrene, benzylmethacrylate, divinylbenzene, and 2-vinylnaphthalene. Of these monomers, a styrene-containing monomer is preferred. A styrene-containing monomer is defined herein to be a monomer that contains a vinyl group bonded directly to a phenyl group in which the phenyl group can be substituted by other than a fused ring, e.g., as above with one to three $C_1$-$C_6$ alkyl groups. Styrene itself [$H_2C$=$CH$—$C_6H_5$] is a particularly preferred styrene-containing monomer.

A cycloalkyl-containing vinylic monomer is defined herein to be a vinylic monomer containing a cycloalkyl which can be substituted by up to three $C_1$-$C_6$ alkyl groups. Preferred cycloalkyl-containing vinylic monomers include, without limitation, acrylates and methacrylates each comprising a cyclopentyl or cyclohexyl or cycloheptyl, which can be substituted by up to 3 $C_1$-$C_6$ alkyl groups. Examples of preferred cycloalkyl-containing vinylic monomers include isobornylmethacrylate, isobornylacrylate, cyclohexylmethacrylate, cyclohexylacrylate, and the like.

In accordance with the present invention, one or more of acrylic acid, $C_1$-$C_{10}$ alkyl methacrylate (e.g., methylmethacrylate, ethylmethacrylate, propylmethacrylate, isopropylmethacrylate, t-butylmethacrylate, neopentyl methacrylate, methacrylonitrile, acrylonitrile, $C_1$-$C_{10}$ alkyl acrylate, N-isopropyl acrylamide, 2-vinylpyridine, and 4-vinylpyridine can be used as blending vinylic monomers. They can also be used together with an aromatic vinylic monomer or a cycloalkyl-containing vinylic monomer. Each of these blending vinylic monomer is capable of forming a homopolymer with a glass transition temperature of above 30° C. As such, by using one or more of these blending monomers can increase the predominant glass transition temperature of a silicone hydrogel material prepared by curing a polymerizable composition containing those preferred blending monomers.

In accordance with the present invention, any know suitable siloxane-containing macromer with ethylenically unsaturated group(s) can be used to produce a silicone hydrogel material. A particularly preferred siloxane-containing macromer is selected from the group consisting of Macromer A, Macromer B, Macromer C, and Macromer D described in U.S. Pat. No. 5,760,100, herein incorporated by reference in its entirety. Macromers that contain two or more polymerizable groups (vinylic groups) can also serve as cross linkers. Di and triblock macromers consisting of polydimethylsiloxane and polyakyleneoxides could also be of utility. Such macromers could be mono or difunctionalized with acrylate, methacrylate or vinyl groups. For example one might use methacrylate end capped polyethyleneoxide-block-polydimethylsiloxane-block-polyethyleneoxide to enhance oxygen permeability.

In accordance with the invention, any chain transfer agent can be used. Examples of preferred chain transfer agent include without limitation mercaptans (e.g., 2-mercaptoethanol), alkane-thiols (e.g., ethanethiol, propanethiol, butanethiol), arylthiols (e.g., thiophenol), disulfide (e.g., di-n-butyl disulfide), carbon tetrabromide, carbon tetrachloride, chloroform, amines (e.g., ethylamine, diethlyamine, triethylamine, butylamine, di and tri-butylamine), methanol, ethanol, propanol, and isopropanol, acetic acid, and acetone. Preferably, a mercaptan is the chain transfer agent.

In accordance with the invention, a polymerizable fluid composition comprises from about 0.05% to about 5%, preferably from about 0.1% to about 3%, more preferably from about 0.2% to about 2%, even more preferably from about 0.25% to about 1% by weight of a chain transfer agent.

In accordance with the present invention, a polymerizable fluid composition can also comprise siloxane-containing monomer. Any known suitable siloxane-containing monomers can be used in the present invention. Exemplary siloxane-containing monomers include, without limitation, methacryloxyalkylsiloxanes, tristrimethylsilyloxysilylpropyl methacrylate (TRIS), 3-methacryloxy propylpentamethyldisiloxane and bis(methacryloxypropyl)tetramethyldisiloxane. A preferred siloxane-containing monomer is TRIS, which is referred to 3-methacryloxypropyltris(trimethylsiloxy)silane, and represented by CAS No. 17096-07-0. The term "TRIS" also includes dimers of 3-methacryloxypropyltris(trimethylsiloxy) silane.

In accordance with the present invention, a polymerizable fluid composition can also comprise a hydrophilic monomer. Nearly any hydrophilic monomer that can act as a plasticizer can be used in the fluid composition of the invention. Suitable hydrophilic monomers are, without this being an exhaustive list, hydroxyl-substituted lower alkyl ($C_1$ to $C_8$) acrylates and methacrylates, acrylamide, methacrylamide, (lower allyl) acrylamides and -methacrylamides, ethoxylated acrylates and methacrylates, hydroxyl-substituted (lower alkyl)acrylamides and -methacrylamides, hydroxyl-substituted lower alkyl vinyl ethers, sodium vinylsulfonate, sodium styrenesulfonate, 2-acrylamido-2-methylpropanesulfonic acid, N-vinylpyrrole, N-vinyl-2-pyrrolidone, 2-vinyloxazoline, 2-vinyl4,4'-dialkyloxazolin-5-one, 2- and 4-vinylpyridine, vinylically unsaturated carboxylic acids having a total of 3 to 5 carbon atoms, amino(lower alkyl)-(where the term "amino" also includes quaternary ammonium), mono(lower alkylamino)(lower alkyl) and di(lower alkylamino)(lower alkyl)acrylates and methacrylates, allyl alcohol and the like.

Among the preferred hydrophilic monomers are N,N-dimethylacrylamide (DMA), 2-hydroxyethylmethacrylate (HEMA), hydroxyethyl acrylate, hydroxypropyl acrylate, hydroxypropyl methacrylate (HPMA), trimethylammonium 2-hydroxy propylmethacrylate hydrochloride, dimethylaminoethyl methacrylate (DMAEMA), dimethylaminoethylmethacrylamide, acrylamide, methacrylamide, allyl alcohol, vinylpyridine, glycerol methacrylate, N-(1,1dimethyl-3-oxobutyl)acrylamide, N-vinyl-2-pyrrolidone (NVP), acrylic acid, methacrylic acid, and N,N-dimethyacrylamide (DMA).

A polymerizable fluid composition can also comprises a hydrophobic monomer. By incorporating a certain amount of hydrophobic monomer in a polymerizable fluid composition, the mechanical properties (e.g., modulus of elasticity) of the resultant polymer may be improved. Examples of suitable hydrophobic vinylic comonomers include methylacrylate, ethyl-acrylate, propylacrylate, isopropylacrylate, cyclohexylacrylate, 2-ethylhexylacrylate, methylmethacrylate, ethylmethacrylate, propylmethacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyl toluene, vinyl ethyl ether, perfluorohexylethyl-thio-carbonyl-aminoethyl-methacrylate, isobornyl methacrylate, trifluoroethyl methacrylate, hexafluoro-isopropyl methacrylate, hexafluorobutyl methacrylate, tris-trimethylsilyloxy-silyl-propyl methacrylate, 3-methacryloxypropyl-pentamethyl-disiloxane and bis (methacryloxypropyl)-tetramethyl-disiloxane. TRIS, which may act both to increase oxygen permeability and to improve the modulus of elasticity, is a particularly preferred hydrophobic monomer.

A polymerizable fluid composition can further comprise an antimicrobial agent, preferably antimicrobial metal nanoparticles, more preferably silver nanoparticles.

In accordance with the present invention, a polymerizable fluid composition can further comprise various components, such as cross-linking agents, initiator, UV-absorbers, inhibitors, fillers, visibility tinting agents (e.g., dyes, pigments, or mixtures thereof, and the like.

Cross-linking agents may be used to improve structural integrity and mechanical strength. Examples of cross-linking agents include without limitation allyl(meth)acrylate, lower alkylene glycol di(meth)acrylate, poly lower alkylene glycol di(meth)acrylate, lower alkylene di(meth)acrylate, divinyl ether, divinyl sulfone, di- or trivinylbenzene, trimethylolpropane tri(meth)acrylate, pentaerythritol tetra(meth)acrylate, bisphenol A di(meth)acrylate, methylenebis(meth)acrylamide, triallyl phthalate or diallyl phthalate. A preferred cross-linking agent is ethylene glycol dimethacrylate (EGDMA).

The amount of a cross-linking agent used is expressed in the weight content with respect to the total polymer and is preferably in the range from 0.05 to 5%, and more preferably in the range from 0.1 to 2%.

Initiators, for example, selected from materials well known for such use in the polymerization art, may be included in the lens-forming fluid material in order to promote, and/or increase the rate of, the polymerization reaction.

Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®. Examples of benzoylphosphine initiators include 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329, herein incorporated by reference in its entirety. The polymerization can then be triggered off by actinic radiation, for example light, in particular UV light of a suitable wavelength. The spectral requirements can be controlled accordingly, if appropriate, by addition of suitable photosensitizers.

Examples of suitable thermal initiators include, but are not limited to, 2,2'-azobis (2,4-dimethylpentanenitrile), 2,2'-azobis (2-methylpropanenitrile), 2,2'-azobis (2-methylbutanenitrile), azobisisobutyronitrile (AIBN), peroxides such as benzoyl peroxide, and the like. Preferably, the thermal initiator is 2,2'-azo-bis(2,4-dimethylvaleronitrile) (VAZO-52).

In accordance with the present invention, the polymerizable fluid composition can further have one or more Tg-enhancing vinylic monomers selected from the group consisting of acrylic acid, $C_1$-$C_4$ alkyl methacrylate (e.g., methylmethacrylate, ethylmethacrylate, propylmethacrylate, isopropylmethacrylate, t-butylmethacrylate), methacrylonitrile, acrylonitrile, $C_1$-$C_4$ alkyl acrylate, N-isopropyl acrylamide, 2-vinylpyridine, and 4-vinylpyridine. It is understood that aromatic monomers and/or cycloalkyl-containing vinylic monomers can be replaced by one or more of the above Tg-enhancing vinylic monomers.

In a preferred embodiment, a polymerizable fluid composition suitable for making an ophthalmic device will include (a) from about 20% to about 46% by weight of a siloxane-containing macromer with ethylenically unsaturated group(s), (b) from about 0.1% to about 5% by weight of a chain transfer agent, (c) from about 5% to 30% by weight of a siloxane- containing monomer, and (d) from about 10% to 35% by weight of a hydrophilic monomer. More preferably, the siloxane-containing monomer is TRIS.

In another preferred embodiment, a solvent-free polymerizable composition of the invention comprises: from about 0 to about 46% by weight of a siloxane-containing macromer with ethylenically unsaturated group(s); from about 0.1% to about 5% by weight of a chain transfer agent, from about 10% to about 30% by weight of a siloxane-containing vinylic monomer; from about 15% to about 50% by weight of a hydrophilic vinylic monomer; and about 5% to about 20% by weight of a blending vinylic monomer.

In another preferred embodiment, a polymerizable composition of the invention comprises: about 0 to about 46% by weight of a siloxane-containing macromer with ethylenically unsaturated group(s); about 0.1% to about 5% by weight of a chain transfer agent; about 10% to about 30% by weight of a siloxane-containing vinylic monomer; from about 15% to about 50% by weight of a hydrophilic vinylic monomer; and about 5% to about 20% by weight of an aromatic vinylic monomer, a cycloalkylmethacrylate or a cycloalkylacrylate.

In another preferred embodiment, a solvent-free polymerizable composition of the invention comprises: from about 0 to about 46% by weight of a siloxane-containing macromer with ethylenically unsaturated group(s); from about 0.1% to about 5% by weight of a chain transfer agent; from about 10% to about 30% by weight of a siloxane-containing vinylic monomer; from about 15% to about 50% by weight of a hydrophilic vinylic monomer; and from about 5% to about 20% by weight of a blending vinylic monomer.

In another preferred embodiment, a polymerizable fluid composition further comprises at least one antimicrobial agent, preferably silver nanoparticles in an amount sufficient to impart to the resultant silicone hydrogel material an antimicrobial activity characterized by having at least a 5-fold reduction ($\geq$80% inhibition), preferably at least a 1-log reduction ($\geq$90% inhibition), more preferably at least a 2-log reduction ($\geq$99% inhibition), of viable microorganisms (e.g., *Pseudomonas aeruginosa* GSU # 3, or *Staphylococcus aureus* ATCC #6538), preferably by having a prolong antimicrobial activity (i.e., effective antimicrobial activity after direct contact with a body fluid over an extended period of time). Antimicrobial activity can be determined according to procedure described in the Examples of U.S. patent application Ser. No. 10/891,407 filed on Jul. 14, 2004 (herein incorporated by reference in its entirety).

As used herein, a "prolong antimicrobial activity" is characterized by having at least a 5-fold reduction ($\geq$80% inhibition), preferably at least a 1-log reduction ($\geq$90% inhibition), more preferably at least a 2-log reduction ($\geq$99% inhibition), of viable microorganisms (e.g., *Pseudomonas aeruginosa* GSU #-3, or *Staphylococcus aureus* ATCC #6538) after at least 5, preferably at least 10, more preferably at least 20, even more preferably at least 30 consecutive soaking/rinsing cycles, each cycle comprising soaking/rinsing one lens in a phosphate buffered saline (PBS) for a period of time from about 24 to about 72 hours, as shown in the Examples of U.S. patent application Ser. No. 10/891,407 filed on Jul. 14, 2004 (herein incorporated by reference in its entirety).

In accordance with a preferred embodiment of the invention, the polymerizable fluid composition is cured (i.e., polymerized) in the presence of oxygen or air. It is found that curing a polymerizable fluid composition in the presence of oxygen or air can also be an effective means for increasing oxygen permeability of the resulting copolymer. It is believed that the presence of oxygen during vinyl polymerization (curing) can increase the selectivity of propagating radicals in such a way as to result in a greater degree of non-randomness or increased "blockiness" in the resulting copolymer microstructure. This, in turn, can result in improved oxygen permeability as compared to copolymers that has a greater degree of microstructure homogeneity. It is believed also that oxygen can combine with monomers and/or propagating radicals to form species with improved selectivity for vinyl polymerization. It is found that the dimensions of "blockiness" in the copolymers produced by curing in the presence of air and or chain transfer agent are not large enough to cause haziness.

In accordance with another preferred embodiment of the invention, free radical initiator concentration in the polymerizable fluid composition or curing temperature is decreased. It has been discovered that oxygen permeability can be increased by decreasing free radical initiator concentration or decreasing cure temperature.

Polymerization (curing) may be initiated by a number of well known techniques, which, depending on the polymerizable material, may include application of radiation such as microwave, thermal, e-beam and ultraviolet. A preferred method of initiating polymerization is by heating (i.e., thermal curing).

The present invention, in another aspect, provides a silicone hydrogel material which: (1) is a copolymerization product of a polymerizable fluid composition comprising (a) at least one siloxane-containing macromer with ethylenically unsaturated group(s) and (b) at least one chain transfer agent in an amount sufficient to provide a reduced elastic modulus to the silicone hydrogel material; and (2) is characterized by having an oxygen permeability of at least about 40 barrers, an ionoflux diffusion coefficient of great than about $1.5 \times 10^{-6}$ mm$^2$/min, and a water content of at least about 15% by weight when fully hydrated.

Any silicone or siloxane-containing vinylic monomers, siloxane-containing polymerizable macromers, chain transfer agents, hydrophilic vinylic monomers, blending vinylic monomers, Tg-enhancing vinylic monomers, aromatic vinylic monomers, cycloalkyl-containing vinylic monomers, cross-linking agents, hydrophobic vinylic monomers, initiator, UV-absorbers, inhibitors, fillers, visibility tinting agents, antimicrobial agents, and polymerizing (curing) techniques described above can be used in this aspect of the invention.

A silicone hydrogel material of the invention has an oxygen permeability of preferably at least about 50 barrers, more preferably at least about 65 barrers, even more preferably at least about 80 barrers. In accordance with the invention, an oxygen permeability is an apparent (directly measured when testing a sample with a thickness of about 100 microns) oxygen permeability according to procedures described in Examples.

A silicone hydrogel material of the invention has a elastic modulus of about 1.5 MPa or less, preferably about 1.2 MPa or less, more preferably about 1.0 or less, even more preferably from about 0.4 MPa to about 1.0 MPa.

A silicone hydrogel material of the invention has an Ionoflux Diffusion Coefficient, D, of, preferably at least about $1.5 \times 10^{-6}$ mm$^2$/min, more preferably at least about $2.6 \times 10^{-6}$ mm$^2$/min, even more preferably at least about $6.4 \times 10^{-6}$ mm$^2$/min.

A silicone hydrogel material of the invention has a water content of preferably from about 18% to about 55%, more preferably from about 20% to about 38% by weight when fully hydrated. The water content of a silicone hydrogel material or a lens can be measured according to Bulk Technique as disclosed in U.S. Pat. No. 5,849,811.

A silicone hydrogel material of the invention can find use in production of ophthalmic devices, preferably contact lenses, more preferably MTO or customized contact lenses.

A silicone hydrogel material of the invention can further have a predominant glass-transition temperature of about 25° C. or higher, preferably about 30° C. or higher, more preferably about 35° C. or higher, even more preferably about 45° C. or higher.

A silicone hydrogel material of the invention can further comprise at least one antimicrobial agent, preferably silver nanoparticles in an amount sufficient to impart to the silicone hydrogel material an antimicrobial activity characterized by having at least a 5-fold reduction ($\geqq$80% inhibition), preferably at least a 1-log reduction ($\geqq$90% inhibition), more preferably at least a 2-log reduction ($\geqq$99% inhibition), of viable microorganisms (e.g., *Pseudomonas aeruginosa* GSU # 3, or *Staphylococcus aureus* ATCC #6538), preferably by having a prolong antimicrobial activity (i.e., effective antimicrobial activity after direct contact with a body fluid over an extended period of time). Antimicrobial activity can be determined according to procedure described in the Examples of U.S. patent application Ser. No. 10/891,407 filed on Jul. 14, 2004 (herein incorporated by reference in its entirety).

The present invention, in a further aspect, provides an ophthalmic device having: (1) a copolymer is a copolymerization product of a polymerizable fluid composition comprising (a) at least one siloxane-containing macromer with ethylenically unsaturated group(s) and (b) at least one chain transfer agent in an amount sufficient to provide a reduced elastic modulus to the copolymer; (2) an oxygen permeability of at least about 40 barrers; (3) an ionoflux diffusion coefficient of great than $1.5 \times 10^{-6}$ mm$^2$/min; and (4) a water content of at least about 15% by weight when fully hydrated.

Above described various embodiments and preferred embodiments of a polymerizable fluid composition and a method for making a silicone hydrogel material of the invention can be used in this aspect of the invention.

An ophthalmic device of the invention preferably is a contact lens.

A contact lens of the invention has an oxygen permeability of preferably at least about 50 barrers, more preferably at least about 65 barrers, even more preferably at least about 80 barrers. In accordance with the invention, an oxygen permeability is an apparent (directly measured when testing a sample with a thickness of about 100 microns) oxygen permeability according to procedures described in Examples.

A contact lens of the invention has a elastic modulus of about 1.5 MPa or less, preferably about 1.2 MPa or less, more preferably about 1.0 or less, even more preferably from about 0.4 MPa to about 1.0 MPa.

A contact lens of the invention further has an Ionoflux Diffusion Coefficient, D, of, preferably at least about $1.5 \times 10^{-6}$ mm$^2$/min, more preferably at least about $2.6 \times 10^{-6}$ mm2/min, even more preferably at least about $6.4 \times 10^{-6}$ mm$^2$/min.

A contact lens of the invention further has a water content of preferably from about 18% to about 55%, more preferably from about 20% to about 38% by weight when fully hydrated. The water content of a silicone hydrogel contact lens can be measured according to Bulk Technique as disclosed in U.S. Pat. No. 5,849,811.

A contact lens of the invention further comprises at least one antimicrobial agent, preferably silver nanoparticles in an amount sufficient to impart to the silicone hydrogel material an antimicrobial activity characterized by having at least a 5-fold reduction ($\geqq$80% inhibition), preferably at least a 1-log reduction ($\geqq$90% inhibition), more preferably at least a 2-log reduction ($\geqq$99% inhibition), of viable microorganisms (e.g., *Pseudomonas aeruginosa* GSU # 3, or *Staphylococcus aureus* ATCC #6538), preferably by having a prolong. antimicrobial activity (i.e., effective antimicrobial activity after direct contact with a body fluid over an extended period of time). Antimicrobial activity can be determined according to procedure described in the Examples of U.S. patent application Ser. No. 10/891,407 filed on Jul. 14, 2004 (herein incorporated by reference in its entirety).

An ophthalmic device of the invention can be made according to any known suitable methods, such as, double-sided molding processes, cast-molding processes, lathing, and combinations thereof.

Where an ophthalmic device of the invention is a contact lens, in particular a MTO or customized contact lens, one can lathe directly at room temperature a rod, preferably a button, more preferably a bonnet of a silicone hydrogel material into the ophthalmic device. Any known suitable lathe apparatus can be used in this invention. Preferably, a computer controllable (or numerically controlled) lathe is used in the invention. More preferably, a numerically controlled two-axis lathe with a 45° piezo cutter or a lathe apparatus disclosed by Durazo and Morgan in U.S. Pat. No. 6,122,999, herein incorporated by reference in its entirety, is used in the invention. Exemplary preferred lathe apparatus include without limitation numerically controlled lathes from Precitech, Inc., for example, such as Optoform ultra-precision lathes (models 30, 40, 50 and 80) having Variform piezo-ceramic fast tool servo attachment. A person skilled in the art will know how to prepare rods, buttons, and bonnets. For example, a rod can be produced by thermally or actinically curing a polymerizable composition of the invention in a tube made of plastic or glass or quartz. The resultant rod optionally can be subjected to a post-curing treatment as described in the copending US patent application, entitled "Method for Lathing Silicone Hydrogel Lenses", herein incorporated by reference in its entirety. The diameter of a tube used in the preparation is larger than the diameter of a contact lens to be made. A rod can be further cut into buttons prior to lathing.

A person skilled in the art knows how to make molds for cast-molding or spin-casting polymer buttons. Preferably, a mold can be used to cast mold buttons, the two opposite surfaces of each of which are curved. For example, one of the two opposite surfaces of a button can be a concave curved (e.g., hemispherical) surface whereas the other surface is a convex curved (e.g., hemispherical) surface. Advantage of cast-molding buttons with two opposite curved surfaces is that less silicone hydrogel material is cut away and therefore wasted. The two curved surfaces of a button can have identical or different curvatures. Preferably, the two curved surfaces are spherical. One could also produce a button with one flat surface and one curved surface.

In the fabrication of buttons by spin casting, the lens-forming material is placed in the mold cavity having an optical concave surface wetted by said material, and then intermittently and forced fed, one at a time, into the inlet end of a rotating polymerization column which desirably comprises a "conditioning" zone near the inlet end and a polymerization reaction zone toward the outlet end. It is preferred that the molds be characterized by a pretreated optical surface to increase its hydrophylicity or wettability in a manner well-know in the art. The speed of rotation of the tube and the molds, when secured in interference fitting relationship, is adjusted to cause and/or maintain radially outward displacement of the lens-forming material to a predetermined lens configuration which when subjected to the polymerization conditions employed in the tube will form the desired shaped contact lens. Rotational speed of, for example, 300 r.p.m., and lower to 600 r.p.m., and higher, can be conveniently used. The precise rotational speed to employ in the operation is, of course, well within the skill of the artisan. Factors to be considered include the type and concentration of the components comprising the lens-forming material employed, the operative conditions of choice, the type and concentration of initiator, and/or the intensity and type of energy source to initiate polymerization, and factors discussed previously and readily apparent to the artisan.

A person skilled in the art knows well that the polymerization column (tube), as typically used in spin casting, has to be fabricated from a material that will not impede the transmission of the actinic radiation into the polymerization zone of the column. Glass, such as PYREX, would be a suitable material for the polymerization column when using long wavelength U.V. light as actinic radiation. When using other types of actinic radiation as recited above, the polymerization column could be fabricated from various types of metals such as steel, nickel, bronze, various alloys, and the like.

A person skilled in the art knows how to make molds for cast-molding polymer bonnets each having an optically finished surface corresponding to one of the anterior and posterior surfaces of the contact lens. Preferably, a mold comprising a mold half having a molding surface with optical quality is used to produce bonnets. The molding surface of the mold half defines one of the posterior and anterior surface of a silicone hydrogel contact lens. Only one side (the anterior surface or posterior surface) of lens and lens edge need to be lathed directly from a bonnet. It is understood that the surface opposite of the optically finished surface of the bonnet can be flat or curved, preferably is a convex hemispherical surface.

The above described spin-casting can also be used to produce a bonnet having an optically finished surface corresponding to the anterior surface of a contact lens.

Where a contact lens (e.g., toric or translating multifocal lens) requires orientation and/or translation features, it would be advantageous that the entire posterior surface and a target geometry, common to all contact lenses and outside of the optical zone, of the anterior surface of a contact lens can be formed by curing a polymerizable composition in a mold for making a bonnet while lathing of a bonnet could be reduced to the finish cuts defining any desired optical zone geometry of the anterior surface of a contact lens while directly molding. As such, time, cost and material waste associated with the production of customized or made-to-order (MTO) contact lenses can be minimized. Customized or made-to-order (MTO) contact lenses can be made to match exactly to any patient's prescription. Such method is described in detail in the copending US patent application entitled "Method for Lathing Silicone Hydrogel Lenses", herein incorporated by reference in its entirety. A mold for making such bonnets includes a first mold half having a first molding surface with optical quality and a second mold half having a second molding surface, wherein the second molding surface has a substantially-annular peripheral molding zone with optical quality, wherein the first molding surface defines the posterior surface of the contact lens, wherein the peripheral molding zone defines the one or more non-optical zones on the anterior surface of the contact lens. A bonnet prepared from such a mold has one optically finished surface corresponding to the posterior surface of the contact lens and one surface having an optically finished zone corresponding to the one or more substantially annular non-optical zones surrounding the central optical zone of the contact lens. One only needs to lathe surface areas, surrounded by the optically-finished zone on the side opposite to the optically-finished surface, of the bonnet, thereby obtaining the contact lens. It is understood that such lens can be made by two-side lathing.

In a preferred embodiment, an ophthalmic device of the invention has a hydrophilic surface obtained by using a surface modification process. The hydrophilic surface refers to a surface having an averaged contact angle of 85 degrees or less when the ophthalmic device is fully hydrated. Preferably, the hydrophilic surface is a plasma coating or an LbL coating.

An "average contact angle" refers to a contact angle of water on a surface of a material (measured by Sessile Drop method), which is obtained by averaging measurements of at least 3 individual samples (e.g., contact lenses). Average contact angles (Sessile Drop) of contact lenses can be measured using a VCA 2500 XE contact angle measurement device from AST, Inc., located in Boston, Mass. This equipment is capable of measuring advancing or receding contact angles or sessile (static) contact angles. The measurements are preferably performed on fully hydrated materials.

Contact angle is a general measure of the surface hydrophilicity of a contact lens or an article (e.g., the cavity surface of a container). In particular, a low contact angle corresponds to more hydrophilic surface.

In a preferred embodiment, the antimicrobial ophthalmic device comprises at least 10 ppm, preferably at least 25 ppm, more preferably at least 40 ppm, even more preferably at least 60 ppm silver nanoparticles distributed therein.

The present invention, in a still further aspect, provides a method for making silicone hydrogel contact lenses with relatively high oxygen permeability and a relatively low modulus. The method of the invention comprises: obtaining a polymerizable fluid composition including a siloxane-containing macromer with ethylenically unsaturated group(s) and at least one chain transfer agent; introducing the polymerizable fluid composition into a mold for making a contact lens; and polymerizing the polymerizable fluid composition in the mold to form a silicone hydrogel contact lens, wherein the chain transfer agent is present in the polymerizable fluid composition in an amount sufficient to provide to the silicone hydrogel contact lens with a reduced elastic modulus while increasing or minimally decreasing or maintaining the oxygen permeability of the silicone hydrogel contact lens, wherein the silicone hydrogel contact lens has an oxygen permeability of at least about 40 barrers, an ionoflux diffusion coefficient of great than about $1.5 \times 10^{-6}$ mm$^2$/min and a water content of at least 15 weight percent when fully hydrated.

Above described various embodiments and preferred embodiments of a polymerizable fluid composition, polymerization, and a method for making a silicone hydrogel material of the invention can be used in this aspect of the invention.

Methods of forming mold sections for cast-molding a contact lens are generally well known to those of ordinary skill in the art. The process of the present invention is not limited to any particular method of forming a mold. In fact, any method of forming a mold can be used in the present invention.

However, for illustrative purposes, the following discussion has been provided as one embodiment of forming a contact lens mold.

In general, a mold comprises at least two mold sections (or portions) or mold halves, i.e. first and second mold halves. The first mold half defines a first optical surface and the second mold half defines a second optical surface. The first and second mold halves are configured to receive each other such that a contact lens forming cavity is formed between the first optical surface and the second optical surface. The first and second mold halves can be formed through various techniques, such as injection molding. These half sections can later be joined together such that a contact lens-forming cavity is formed therebetween. Thereafter, a contact lens can be formed within the contact lens-forming cavity using various processing techniques, such as ultraviolet curing.

Examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Boneberger et al., which are also incorporated herein by reference.

Virtually all materials known in the art for making molds can be used to make molds for making contact lenses. For example, polymeric materials, such as polyethylene, polypropylene, and PMMA can be used. Other materials that allow UV light transmission could be used, such as quartz glass.

Thermal curing or photo curing methods can be used to curing a polymerizable composition in a mold to form an ophthalmic lens. Such curing methods are well-known to a person skilled in the art.

The previous disclosure will enable one having ordinary skill in the art to practice the invention. In order to better enable the reader to understand specific embodiments and the advantages thereof, reference to the following examples is suggested.

EXAMPLE 1

Unless otherwise stated, all chemicals are used as received. Differential scan calorimetric (DSC) experiments are carried out in aluminum pans in a nitrogen atmosphere using a TA Instruments 2910 DSC. The instrument is calibrated with indium. Glass tubes used for making rods of silicone hydrogel materials are silanized prior to use. Lenses are extracted with isopropanol (isopropyl alcohol) for at least 4 hours and subjected plasma treatment according to procedures described in published U.S. patent application No. 2002/0025389 to obtain plasma coatings. Oxygen and ion permeability measurements are carried out either with lenses after extraction and plasma coating or with lenses without plasma coating. Non-plasma coated lenses are used for tensile testing and water content measurements.

Oxygen Permeability Measurements. The oxygen permeability of a lens and oxygen transmissibility of a lens material is determined according to a technique similar to the one described in U.S. Pat. No. 5,760,100 and in an article by Winterton et al., (The Cornea: Transactions of the World Congress on the Cornea 111, H. D. Cavanagh Ed., Raven Press: New York 1988, pp 273-280), both of which are herein incorporated by reference in their entireties. Oxygen fluxes (J) are measured at 34° C. in a wet cell (i.e., gas streams are maintained at about 100% relative humidity) using a Dk1000 instrument (available from Applied Design and Development Co., Norcross, Ga.), or similar analytical instrument. An air stream, having a known percentage of oxygen (e.g., 3%-21%), is passed across one side of the lens at a rate of about 10 to 20 cm$^3$/min., while a nitrogen stream is passed on the opposite side of the lens at a rate of about 10 to 20 cm$^3$/min. A sample is equilibrated in a test media (i.e., saline or distilled water) at the prescribed test temperature for at least 30 minutes prior to measurement but not more than 45 minutes. Any test media used as the overlayer is equilibrated at the prescribed test temperature for at least 30 minutes prior to measurement but not more than 45 minutes. The stir motor's speed is set to 1200±50 rpm, corresponding to an indicated setting of 400±15 on the stepper motor controller. The barometric pressure surrounding the system, $P_{measured}$, is measured. The thickness (t) of the lens in the area being exposed for testing is determined by measuring about 10 locations with a Mitotoya micrometer VL-50, or similar instrument, and averaging the measurements. The oxygen concentration in the nitrogen stream (i.e., oxygen which diffuses through the lens) is measured using the DK1000 instrument. The apparent oxygen permeability of the lens material, $Dk_{app}$, is determined from the following formula:

$$Dk_{app} = Jt/(P_{oxygen})$$

where J=oxygen flux [microliters O$_2$/cm$^2$-minute]
$P_{oxygen} = (P_{measured} - P_{water}\ \text{vapor}) = (\%\ O_2\ \text{in air stream})$
[mm Hg]=partial pressure of oxygen in the air stream
$P_{measured}$=barometric pressure (mm Hg)
$P_{water}$ vapor=0 mm Hg at 34° C. (in a dry cell) (mm Hg)
$P_{water}$ vapor=40 mm Hg at 34° C. (in a wet cell) (mm Hg)
t=average thickness of the lens over the exposed test area (mm) where $Dk_{app}$ is expressed in units of barrers.

The oxygen transmissibility (Dk/t) of the material may be calculated by dividing the oxygen permeability ($Dk_{app}$) by the average thickness (t) of the lens.

Ion Permeability Measurements. The ion permeability of a lens is measured according to procedures described in U.S. Pat. No. 5,760,100 (herein incorporated by reference in its entirety. The values of ion permeability reported in the following examples are relative ionoflux diffusion coefficients (D/D$_{ref}$) in reference to a lens material, Alsacon, as reference material. Alsacon has an ionoflux diffusion coefficient of 0.314×10$^{-3}$ mm$^2$/minute.

EXAMPLE 2

Synthesis of Siloxane-Containing Macromer with Ethylenically Unsaturated Group(s)

51.5 g (50 mmol) of the perfluoropolyether Fomblin® ZDOL (from Ausimont S.p.A, Milan) having a mean molecular weight of 1030 g/mol and containing 1.96 meq/g of hydroxyl groups according to end-group titration is introduced into a three-neck flask together with 50 mg of dibutyltin dilaurate. The flask contents are evacuated to about 20 mbar with stirring and subsequently decompressed with argon. This operation is repeated twice. 22.2 g (0.1 mol) of freshly distilled isophorone diisocyanate kept under argon are subsequently added in a counterstream of argon. The temperature in the flask is kept below 30° C. by cooling with a waterbath. After stirring overnight at room temperature, the reaction is complete. Isocyanate titration gives an NCO content of 1.40 meq/g (theory: 1.35 meq/g).

202 g of the α,ω-hydroxypropyl-terminated polydimethylsiloxane KF-6001 from Shin-Etsu having a mean molecular weight of 2000 g/mol (1.00 meq/g of hydroxyl groups according to titration) are introduced into a flask. The flask contents are evacuated to approx. 0.1 mbar and decompressed with argon. This operation is repeated twice. The degassed siloxane is dissolved in 202 ml of freshly distilled toluene kept under argon, and 100 mg of dibutyltin dilaurate (DBTDL) are added. After complete homogenization of the solution, all the perfluoropolyether reacted with isophorone diisocyanate (IPDI) is added under argon. After stirring overnight at room temperature, the reaction is complete. The solvent is stripped off under a high vacuum at room temperature. Microtitration shows 0.36 meq/g of hydroxyl groups (theory 0.37 meq/g).

13.78 g (88.9 mmol) of 2-isocyanatoethyl methacrylate (IEM) are added under argon to 247 g of the α,σ-hydroxypropyl-terminated polysiloxane-perfluoropolyether-polysiloxane three-block copolymer (a three-block copolymer on stoichiometric average, but other block lengths are also present). The mixture is stirred at room temperature for three days. Microtitration then no longer shows any isocyanate groups (detection limit 0.01 meq/g). 0.34 meq/g of methacryl groups are found (theory 0.34 meq/g).

The macromer prepared in this way is completely colorless and clear. It can be stored in air at room temperature for several months in the absence of light without any change in molecular weight.

EXAMPLE 3

This example illustrates the effectiveness of chain transfer for reducing elastic modulus of silicone hydrogel contact lenses.

DMA, macromer prepared in Example 2, TRIS, styrene, 2-ethyhexylmethacrylate, VAZO-52, and a chain transfer agent (2-mercaptoethanol) are mixed to prepare solvent free formulations shown in Table 1 for making room temperature lathable silicone hydrogel materials. The above-prepared formulations are sparged with nitrogen and then poured into silanized glass test tubes (about 75 ml of the formulation). Each tube is capped with rubber septa and then underwent degassing cycles as follows. Vacuum is applied to each tube filled with the formulation for several minutes and then pressure is equalized with nitrogen. Such degassing pressure equalization operation is repeated three times.

TABLE 1

| Components | Control Formulation | Test Formulation |
|---|---|---|
| Macromer* | 37.93 | 37.82 |
| TRIS | 17.91 | 17.86 |
| DMA | 33.75 | 33.65 |
| Styrene | 6.99 | 6.97 |
| 2-ethylhexylmethacrylate | 3.14 | 3.13 |
| VAZO-52 | 0.26 | 0.26 |
| 2-mercaptoethanol | 0 | 0.30 |

*Prepared in Example 2.

The Control formulation are thermally cured and post cured according to the following thermal curing schedule: (a) at 30° C. for 42 hours in an oil bath; (b) at 50° C. for 6 hours in a force air oven; (c) at 75° C. for 6 hours in a force air oven; and (d) at 105° C. for 30 hours in a force air oven. 60 minute ramp rates are used in the cure oven to reach each cure temperature. A 4 hour cool down ramp is used to cool samples from 105° C. to 30° C. at the end of curing.

The Text formulation is thermally cured and post cured according to the following schedule: (a) at 30° C. for 24 hours in an oil bath; (b) at 40° C. for 24 hours in an oil bath; (c) at 50° C. for 6 hours in a force air oven; (d) at 75° C. for 6 hours in a force air oven; and (e) at 105° C. for 30 hours in a force air oven. 60 minute ramp rates are used in the cure oven to reach each cure temperature. A 4 hour cool down ramp is used to cool samples from 105° C. to 30° C. at the end of curing.

Polymer cut from cured rod is tested for glass transition temperature ($T_g$) according to DSC analysis at a scan rate of 20° C./minute. Results are reported in Table 2.

TABLE 2

| Properties | Control | Text |
|---|---|---|
| Tg ($1^{st}$ scan) dry polymer | 56° C. | 44° C. |
| Tg ($2^{nd}$ scan) dry polymer | 55° C. | 42° C. |

Lens Preparation

Button Generation Process: Polymerized Silicone Hydrogel rods are removed from the glass tubes. After separating the polymer rods from the glass tubes, rods are grinded using a center less grinding machine plus its grinding oil, in order to remove any superficial rod deformity due to its polymerization process and to assure the same rod diameter time after time.

Button Trimming Process: Grinded polymer rods are converted into buttons using button trimming lathes. Each Silicone Hydrogel rod is loaded into the button trimming lathe collet mechanism and four (4) forming carbide tools form the button shape while the spindle rotates at 3000 revolutions per minutes. Silicone Hydrogel buttons are then packed into aluminum bags to avoid any pre-hydration. Button trimming process takes place in an environment condition of up to about 35%, preferably about 20% relative humidity (Rh) at about 72° F.

Mini File Generation: The geometry to achieve the lens design is described in a file called mini file. The mini file (.MNI) is a geometric description of the profile to be generated that allows complex geometries to be described with comparatively small files and the time to process these files is relatively small when compared with job files (.JFL). Mini files for silicone Hydrogel are created using Mini File Engine software package. The mini files describe any surface in a reasonable number of zones and is unique for each order.

Lens Lathing: Once the polymer button and mini files have been generated, OPTOFORM lathes (any one of Optoform 40, Optoform 50, and Optoform 80 with or without the Variform or Varimax third axis attachment) plus their off axis conic generators are used to perform the concave or convex lens lathing. Lathing step take place in an environment of 20%±2% Rh with a temperature of 72±2° F. During lathing natural or synthetic control waviness diamond tools are used. Machining speed of lens lathing goes form 2500-10,000 RPM with feed rates that ranges form 10-30 mm/min. During lathing process, a compress air at a dew point of about −60° F. is used for blow off debris for a clean cut. Finished parts are inspected for compliance.

Non-plasma coated and sterilized lenses are tested for modulus and Oxygen permeability. Results are given in Table 3. For tensile testing, strain rate of 12 mm/min, gauge length of 6.5 mm, strips (2.90 mm width, and 0.096 mm thickness) are used. All samples are submerged in a saline bath during tensile testing. Lenses are autoclaved prior to testing. Oxygen permeability of lenses are determined according to the method disclosed by Nicolson et al. (U.S. Pat. No. 5,760,100) (herein incorporated by reference in its entirety). A plurality of lenses are tested and averaged oxygen and ion permeabilities are used in testing.

TABLE 3

| Properties | Lenses prepared from formulation | |
|---|---|---|
| | Control | Test |
| Modulus (MPa) | 1.15 | 0.70 |
| Dk (Barrer) | 43.2 | 51.9 |

1. Non-plasma coated lenses are used for tensile testing and water content measurements.

EXAMPLE 4

This example illustrates studies to determine factors that can affect material properties of lathable silicone hydrogel polymers using design of experiment methods (DOE). In these experiments monomer and macromer composition is maintained essentially constant while initiator and chain transfer agent concentration is varied. Process factors such as cure temperature, cure time, cure atmosphere (air/nitrogen) staging temperature and staging time are varied.

Lens formulations are prepared by first dissolving VAZO-52 in DMA. This solution is then combined with TRIS, macromer (pepared in Example 2), Styrene, and 2-mercaptoethanol (chain transfer agent). Samples are stirred under low shear until homogenous using a spatula. Samples are then further mixed on a stir plate for about 30 minutes. The compositions (percentage by weight) of the prepared formulations are shown in Table 4.

TABLE 4

| Formulation No. | Macromer | TRIS | DMA | Styrene | VAZO-52 | 2-mercaptoethanol |
|---|---|---|---|---|---|---|
| 1 | 38.00 | 20.00 | 31.44 | 10.01 | 0.35 | 0.203 |
| 2 | 38.00 | 20.01 | 31.64 | 10.01 | 0.25 | 0.100 |
| 3 | 38.00 | 20.00 | 31.54 | 10.00 | 0.35 | 0.101 |
| 4 | 38.00 | 20.00 | 31.54 | 10.00 | 0.35 | 0.101 |
| 5 | 38.00 | 20.00 | 31.54 | 10.01 | 0.251 | 0.204 |
| 6 | 37.99 | 20.00 | 31.64 | 10.02 | 0.251 | 0.101 |
| 7 | 37.99 | 20.00 | 31.55 | 10.00 | 0.250 | 0.209 |
| 8 | 37.99 | 20.00 | 31.43 | 10.00 | 0.351 | 0.208 |

For experiments involving nitrogen, the lens formulations are sparged with nitrogen for about 1 minute prior to dispensing into silanized glass tubes (25 mm×250 mm). If curing is done in air, then there is no nitrogen sparging.

Glass tubes are washed, dried and then coated with a 2 weight percent solution of silanizing agent in 98% isopropanol as follows. Tubes are filled with silanizing agent, drained, inverted, placed in a rack and then placed in an oven heated to 125° C. for 24 hours. The silanizing agent used is SR80M methylsiloxane product available from GE silicones (Waterford, N.Y.).

An amount of a formulation is added into the tubes after the above teatment. Tubes are sealed with rubber septa and then aged for specified times at temperatures specified in the DOE. For curing in nitrogen, samples are de-gassed and then pressurized with nitrogen (until septa bulge) three times before being placed in the cure bath. For cases involving curing in air, the samples are de-gassed and then pressure is equalized by bleeding air into the tubes (three cycles) prior to placing samples in the cure bath.

Samples are cured as specified in the DOE and then post cured in a forced air oven. All rods are post cured as follows: 50° C./6 hours, 75° C./6 hours, 105° C./30 hours. Post curing is conducted in forced air oven. One hour ramps are used to reach each post cure temperature.

Lenses are prepared as described in Example 3. Lens characterization are carried out as described in Examples 1 and 3.

The effect of staging temperature, staging time, cure temperature, concentration of chain transfer agent, initiator level, and oxygen/nitrogen levels are systematically investigated in a fractional factorial experimental design. The studied process factors investigated are summarized below in Table 5. Oxygen permeability (Dk), ion permeability (IP), elastic modulus (Modulus, MPa), elongation at break ($E_{at}B$), water content when fully hydrated ($H_2O$), refractive index (RI), and percentage of out of round lenses before extraction are summarized in Table 6.

TABLE 5

| Run No. | Formulation No. | $t_{Staging}$ (hrs) | $T_{Staging}$ (° C.) | $T_{curing}$ (° C.) | $T_{curing}$ (hrs) | $N_2$ (%) |
|---|---|---|---|---|---|---|
| 1 | 1 | 2.00 | 30.00 | 45.00 | 48 | 100.00 |
| 2 | 2 | 1.00 | 22.00 | 45.00 | 48 | 100.00 |
| 3 | 3 | 1.00 | 30.00 | 45.00 | 24 | 79.00 |
| 4 | 4 | 2.00 | 22.00 | 35.00 | 24 | 100.00 |
| 5 | 5 | 1.00 | 30.00 | 35.00 | 24 | 100.00 |
| 6 | 6 | 2.00 | 30.00 | 35.00 | 48 | 79.00 |
| 7 | 7 | 2.00 | 22.00 | 45.00 | 24 | 79.00 |
| 8 | 8 | 1.00 | 22.00 | 35.00 | 48 | 79.00 |

TABLE 6

| Run No. | Dk | IP | Modulus | $E_{at}B$ (%) | $H_2O$ (%) | RI | Defects (%)* Out of round lenses before extraction |
|---|---|---|---|---|---|---|---|
| 1 | 22 | 2.48 | 0.87 | 186 | 27.9 | 1.4359 | 0 |
| 2 | 25 | 2.36 | 1.05 | 139 | 28.8 | 1.4365 | 0 |
| 3 | 47 | 2.41 | 1.08 | 127 | 27.2 | 1.4351 | 0 |
| 4 | 22 | 2.55 | 1.04 | 123 | 26.9 | 1.4368 | 15 |
| 5 | 37 | 17* | 0.82 | 50.7* | N/A | N/A | 100 |
| 6 | 54 | 2.56 | 1.06 | 264 | 27.0 | 1.4366 | 15 |
| 7 | 53.5 | 2.85 | 0.91 | 198 | 27.0 | 1.4353 | 0 |
| 8 | 53 | 3.15 | 0.94 | 305 | 28.4 | 1.4348 | 100 |

*Lens defects observed out of round before extraction
Notes:
1. Dk values are determined polarographically.
2. Data marked by * were not used in data analyses.

These experiments demonstrate that it is possible to significantly alter Dk and elastic modulus while having without changing composition significantly and that it is possible to increase Dk while decreasing modulus. Some lens groups are found to have an out of round defect. This defect is found to be related to cure conditions and the level of chain transfer agent present in a formulation. Interestingly, this defect can be eliminated during lens extraction.

EXAMPLE 5

This example illustrates the effectiveness of chain transfer for reducing elastic modulus of silicone hydrogel contact lenses.

DMA, macromer prepared in Example 2, TRIS, styrene, 2-ethyhexylmethacrylate, VAZO-52, and a chain transfer agent (2-mercaptoethanol) are mixed to prepare solvent free formulations shown in Table 7 for making room temperature lathable silicone hydrogel materials. The above-prepared formulations are sparged with nitrogen and then poured into silanized glass test tubes (about 75 ml of the formulation). Each tube is capped with rubber septa and then underwent degassing cycles as follows. Vacuum is applied to each tube filled with the formulation for several minutes and then pressure is equalized with nitrogen. Such degassing pressure equalization operation is repeated three times.

TABLE 7

| Components | Macromer* | TRIS | DMA | Styrene | VAZO-52 | 2-mecaptoethanol |
|---|---|---|---|---|---|---|
| Formulation | 38.00 | 17.50 | 34.00 | 10.00 | 0.25 | 0.25 |

*Prepared in Example 2.

The above-prepared formulation is thermally cured and post cured according to the following schedule: (a) at 45° C. for 48 hours in a water bath; (b) at 45° C. for one hour in a forced air oven; (c) at 50° C. for 6 hours in a force air oven; (d) at 75° C. for 6 hours in a force air oven; and (e) at 105° C. for 30 hours in a force air oven. 60 minute ramp rates are used in the cure oven to reach each cure temperature. A 4 hour cool down ramp is used to cool samples from 105° C. to 30° C. at the end of curing.

Lens Preparation

Lenses are prepared according to the procedure described in Example 3. Tensile properties; water content and contact angle measurements are performed on non-plasma coated lenses as described in Example 3.

Oxygen permeability of plasma coated lenses are determined as follows. Lenses are extracted with isopropanol for 4 hours, extracted in water for a total of 2 hours, dried, plasma coated, then rehydrated, packaged in a phosphate buffered saline and sterilized (autoclave for about 45 minutes at 123° C.). Oxygen permeability and ion permeability of plasma coated lenses are determined according to the method disclosed by Nicolson et al. (U.S. Pat. No. 5,760,100) (herein incorporated by reference in its entirety). A plurality of lenses are tested. It is found that the resultant contact lenses have a contact angle ranging from 71 degrees to 85 degrees, a water content of about 23%, a modulus of about 1.0 MPa, and an oxygen permeability of about 50 barres.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part. Therefore, the spirit and scope of the appended claims should not be limited to the description of the preferred versions contained therein.

What is claimed is:

1. A silicone hydrogel material, which is obtained by polymerizing a polymerizable fluid composition comprising at least one siloxane-containing macromer with ethylenically unsaturated group(s) and from about 0.05% to about 5% by weight of a chain transfer agent, wherein the chain transfer agent is incorporated in the polymerizable fluid composition in an amount sufficient to provide a reduced elastic modulus to a resultant silicone hydrogel material while increasing or minimally reducing the resultant silicone hydrogel's oxygen permeability, and which has an oxygen permeability of at least about 40 barrers, an ionoflux diffusion coefficient of great than about $1.5 \times 10^{-6}$ mm$^2$/min, an elastic modulus of about 1.2 MPa or less, and a water content of at least about 15% by weight when fully hydrated, wherein the chain transfer agent is a mercaptan, alkane-thiols, an aryithiols, a disulfide, carbon tetrabromide, carbon tetrachloride, chloroform, an amine, or mixtures thereof.

2. The silicone hydrogel material of claim 1, wherein the oxygen permeability is at least about 50 barrers.

3. The silicone hydrogel material of claim 1, wherein the silicone hydrogel material has a elastic modulus of from about 0.4 MPa to about 1.0 MPa.

4. The silicone hydrogel material of claim 3, wherein the polymerizable fluid composition further comprises one or more members selected from the group consisting of a hydrophilic vinylic monomer, an antimicrobial agent, a silicon-containing vinylic monomer, a blending vinylic monomer, a cross-linking agent, an radical initiator, an UV-absorbers, a visibility tinting agent.

5. The silicone hydrogel material of claim 3, wherein the polymerizable fluid composition is a solvent-free liquid comprising a blending vinylic monomer, wherein the blending vinylic monomer is an aromatic vinylic monomer, a cycloalkyl-containing vinylic monomer, a Tg-enhancing vinylic monomer, or a mixture thereof, wherein the Tg-enhancing vinylic monomer is selected from the group consisting of acrylic acid, $C_1$-$C_{10}$ alkyl methacrylate, methacrylonitrile, acrylonitrile, $C_1$-$C_{10}$ alkyl acrylate, N-isopropyl acrylamide, 2-vinylpyridine, and 4-vinylpyridine.

6. The silicone hydrogel material of claim 5, wherein the blending vinylic monomer is an aromatic vinylic monomer which is styrene, 2,4,6-trimethylstyrene (TMS), t-butyl styrene (TBS), 2,3,4,5,6-pentafluorostyrene, benzylmethacrylate, divinylbenzene, or 2-vinylnaphthalene.

7. The silicone hydrogel material of claim 5, wherein the blending vinylic monomer is a vinylic monomer containing a cyclopentyl, cyclohexyl or cycloheptyl, which can be substituted by up to 3 $C_1$-$C_6$ alkyl groups.

8. The silicone hydrogel material of claim 3, wherein the polymerizable fluid composition comprising a hydrophilic vinylic monomer which is N,N-dimethylacrylamide (DMA), 2-hydroxyethylmethacrylate (HEMA), 2-hydroxyethyl acrylate (HEA), hydroxypropyl acrylate, hydroxypropyl methacrylate (HPMA), trimethylammonium 2-hydroxy propylmethacrylate hydrochloride, dimethylaminoethyl methacrylate (DMAEMA), glycerol methacrylate (GMA), N-vinyl-2-pyrrolidone (NVP), dimethylaminoethylmethacrylamide, acrylamide, methacrylamide, allyl alcohol, vinylpyridine, N-(1,1dimethyl-3-oxobutyl)acrylamide, acrylic acid, methacrylic acid, or mixtures thereof.

9. The silicone hydrogel material of claim 1, wherein the chain transfer agent is a mercaptan.

10. The silicone hydrogel material of claim 3, wherein the polymerizable fluid composition comprises from about 0.05% to about 1% by weight of a chain transfer agent.

11. The silicone hydrogel material of claim 3, wherein the polymerizable fluid composition includes (a) from about 20% to about 46% by weight of a siloxane-containing macromer with ethylenically unsaturated group(s), (b) from about 0.1% to about 1% by weight of a chain transfer agent, (c) from about 5% to 30% by weight of a silicone-containing monomer, and (d) from about 10% to 35% by weight of a hydrophilic monomer.

12. The silicone hydrogel material of claim 11, wherein the silicon-containing vinylic monomer is methacryloxyalkylsiloxanes, 3-methacryloxy propylpentamethyldisiloxane, bis (methacryloxypropyl)tetramethyl-disiloxane, monomethacrylated polydimethylsiloxane, monoacrylated polydimethylsiloxane, mercapto-terminated polydimethylsiloxane, N-[tris(trimethylsiloxy)silylpropyl]acrylamide, N-[tris(trimethylsiloxy)silylpropyl]methacrylamide, tristrimethylsilyloxysilylpropyl methacrylate (TRIS), or mixtures thereof.

13. The silicone hydrogel material of claim 3, wherein the polymerizable fluid composition is a solvent-free polymerizable composition which comprises: from about 0 to about 46% by weight of a siloxane-containing macromer with ethylenically unsaturated group(s); from about 0.1% to about 1% by weight of a chain transfer agent, from about 10% to about 30% by weight of a silicone-containing vinylic monomer; from about 15% to about 50% by weight of a hydrophilic vinylic monomer; and from about 5% to about 20% by weight of a blending vinylic monomer.

14. The silicone hydrogel material of claim 3, wherein the polymerizable fluid composition further comprises silver nanoparticles in an amount sufficient to impart to the resultant silicone hydrogel material an antimicrobial activity characterized by having at least a 5-fold reduction ($\geq$80% inhibition) of viable microorganisms (e.g., *Pseudomonas aeruginosa* GSU #3, or *Staphylococcus aureus* ATCC #6538).

15. The silicone hydrogel material of claim 3, wherein the silicone hydrogel material is obtained by curing the polymerizable fluid composition in the presence of oxygen or air.

16. The silicone hydrogel material of claim 3, further having a predominant glass-transition temperature of about 25° C. or higher.

17. An ophthalmic device, having:
(1) a copolymer is obtained by polymerizing a polymerizable fluid composition comprising
   (a) at least one siloxane-containing macromer with ethylenically unsaturated group(s) and
   (b) from about 0.05% to about 5% by weight of a chain transfer agent, wherein the chain transfer agent is incorporated in the polymerizable fluid composition in an amount sufficient to provide a reduced elastic modulus to the copolymer while increasing or minimally reducing the copolymers oxygen permeability;
(2) an oxygen permeability of at least about 40 barrers;
(3) an ionoflux diffusion coefficient of great than about $1.5 \times 10^{-6}$ mm$^2$/min;
(4) an elastic modulus of about 1.2 MPa or less; and
(5) a water content of at least about 15% by weight when fully hydrated, wherein the chain transfer agent is a mercaptan, alkane-thiols, an aryithiols, a disulfide, carbon tetrabromide, carbon tetrachloride, chloroform, an amine, or mixtures thereof.

18. The ophthalmic device of claim 17, wherein the ophthalmic device is a contact lens.

19. The ophthalmic device of claim 18, wherein the oxygen permeability is at least about 50 barrers.

20. The ophthalmic device of claim 18, wherein the ophthalmic device has an elastic modulus of from about 0.4 MPa to about 1.0 MPa.

21. The ophthalmic device of claim 18, wherein the ophthalmic device comprises at least one antimicrobial agent in an amount sufficient to impart to the ophthalmic device an antimicrobial activity characterized by having at least a 5-fold reduction ($\geq$80% inhibition) of viable microorganisms (e.g., *Pseudomonas aeruginosa* GSU #3, or *Staphylococcus aureus* ATCC #6538).

22. The ophthalmic device of claim 21, wherein the antimicrobial agent comprises silver nanoparticles.

23. The ophthalmic device of claim 18, wherein the ophthalmic device has a hydrophilic surface obtained by using a surface modification process.

24. The ophthalmic device of claim 18, wherein the polymerizable fluid composition comprising a hydrophilic vinylic monomer which is N,N-dimethylacrylamide (DMA), 2-hydroxyethylmethacrylate (HEMA), 2-hydroxyethyl acrylate (HEA), hydroxypropyl acrylate, hydroxypropyl methacrylate (HPMA), trimethylammonium 2-hydroxy propylmethacrylate hydrochloride, dimethylaminoethyl methacrylate (DMAEMA), glycerol methacrylate (GMA), N-vinyl-2-pyrrolidone (NVP), dimethylaminoethylmethacrylamide, acrylamide, methacrylamide, allyl alcohol, vinylpyridine, N-(1,ldimethyl-3-oxobutyl)acrylamide, acrylic acid, methacrylic acid, or mixtures thereof.

25. The ophthalmic device of claim 17, wherein the chain transfer agent is a mercaptan.

26. The ophthalmic device of claim 18, wherein the polymerizable fluid composition comprises from about 0.05% to about 1% by weight of a chain transfer agent.

27. The ophthalmic device of claim 18, wherein the polymerizable fluid composition includes (a) from about 20% to about 46% by weight of a siloxane-containing macromer with ethylenically unsaturated group(s), (b) from about 0.1% to about 1% by weight of a chain transfer agent, (c) from about 5% to 30% by weight of a silicone-containing monomer, and (d) from about 10% to 35% by weight of a hydrophilic monomer.

28. The ophthalmic device of claim 18, wherein the polymerizable fluid composition comprises a silicon-containing vinylic monomer which is methacryloxyalkylsiloxanes, 3-methacryloxy propylpentamethyldisiloxane, bis(methacryloxypropyl)tetramethyl-disiloxane, monomethacrylated polydimethylsiloxane, monoacrylated polydimethylsiloxane, mercapto-terminated polydimethylsiloxane, N-[tris(trimethylsiloxy)silylpropyl]acrylamide, N-[tris(trimethylsiloxy)silylpropyl]-methacrylamide, tristrimethylsilyloxysilylpropyl methacrylate (TRIS), or mixtures thereof.

29. The ophthalmic device of claim 23, wherein the hydrophilic surface is a plasma or LbL coating.

30. A method for making a silicone hydrogel material, comprising the steps of: obtaining a polymerizable fluid composition including a siloxane-containing macromer with ethylenically unsaturated group(s) and from about 0.05% to about 5% by weight of a chain transfer agent; and polymerizing the polymerizable fluid composition to form the silicone hydrogel material, wherein the chain transfer agent is present in the polymerizable fluid composition in an amount sufficient to provide a reduced elastic modulus to the silicone hydrogel material while increasing or minimally decreasing or maintaining the oxygen permeability of the silicone hydrogel material, wherein the silicone hydrogel material has an oxygen permeability of at least about 40 barrers, an ionoflux diffusion coefficient of great than about $1.5 \times 10^{-6}$ mm$^2$/min, an elastic modulus of about 1.2 MPa or less, and a water content of at least about 15% by weight when fully hydrated, wherein the chain transfer agent is a mercaptan, alkane-thiols, an aryithiols, a disulfide, carbon tetrabromide, carbon tetrachloride, chloroform, an amine, or mixtures thereof.

31. The method of claim 30, wherein the polymerizable fluid composition is a solution, a dispersion, a solvent-free liquid, or a melt at a temperature below 60° C.

32. The method of claim 30, wherein the polymerizable fluid composition is obtained by adding a desired amount of one or more chain transfer agent into a formulation for making silicone hydrogel contact lenses.

33. The method of claim 30, wherein the step of polymerizing is carried out in the presence of oxygen.

34. A method for making silicone hydrogel contact lenses, comprising the steps of: obtaining a polymerizable fluid composition including a siloxane-containing macromer with ethylenically unsaturated group(s) and from about 0.05% to about 5% by weight of a chain transfer agent; introducing the polymerizable fluid composition into a mold for making a contact lens; and polymerizing the polymerizable fluid composition in the mold to form a silicone hydrogel contact lens, wherein the chain transfer agent is present in the polymerizable fluid composition in an amount sufficient to provide to the silicone hydrogel contact lens with a reduced elastic modulus while increasing or minimally decreasing or maintaining the oxygen permeability of the silicone hydrogel contact lens, wherein the silicone hydrogel contact lens has an oxygen permeability of at least about 40 barrers, an ionoflux diffusion coefficient of great than about $1.5 \times 10^{-6}$ mm$^2$/min, an elastic modulus of about 1.2 MPa or less, and a water content of at least 15 weight percent when fully hydrated, wherein the chain transfer agent is a mercaptan, alkane-thiols, an aryithiols, a disulfide, carbon tetrabromide, carbon tetrachloride, chloroform, an amine, or mixtures thereof.

* * * * *